United States Patent Office 2,916,688
Patented Dec. 8, 1959

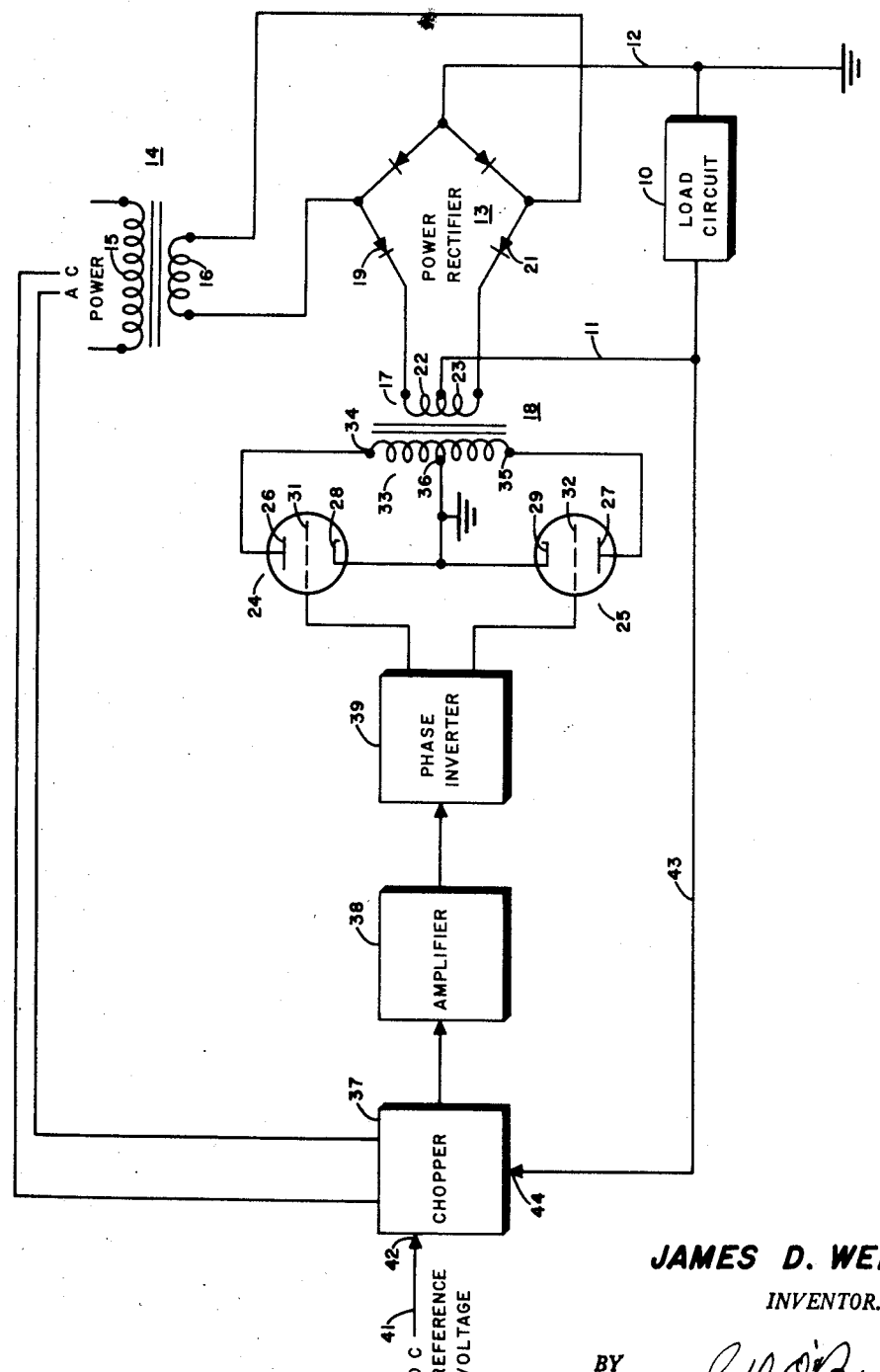

2,916,688

ELECTRIC REGULATING APPARATUS

James D. Weir, Milesburg, Pa., assignor, by mesne assignments, to the United States of America as represented by the Secretary of the Navy Application November 13, 1957, Serial No. 696,303

2 Claims. (Cl. 321—18)

This invention relates to electric regulating and limiting apparatus and more particularly to an improved electric regulating and limiting apparatus of the type in which the alternating voltage impressed upon a rectifier which supplies current to a load is varied under control of load variations for maintaining the load voltage substantially constant.

It is often desirable to limit the load voltage in low voltage-high current applications. However, due to the fact that the low voltage may be of the order of only several volts or less, considerable difficulty is encountered in utilizing such a low voltage to obtain satisfactory regulation. A further difficulty is that at such operating potentials a variation of one volt or less will be a considerable percentage of the load voltage, hence an extremely fast and high degree of regulation is necessary to maintain the load voltage substantially constant. Additionally, the regulating apparatus must be able to operate independently of the large load current. A still further difficulty present in prior art regulators is that regulating apparatus designed for low voltage-high current operation is incompatible for high voltage-low current operation because of the inherent operating characteristics of the regulating apparatus. In some cases the regulator may be used to a limited extent in either situation, but the percent of regulation is invariably adversely affected and such regulators are generally unsatisfactory for any use other than the use for which they were designed. In addition to the disadvantages enumerated hereinabove, regulated prior art low voltage-high current rectifiers require special components such as for example magnetic amplifiers, nobatrons and the like, expensive high voltage components because of the voltage dropped between the source and the load, they contain involved circuitry and require expensive manufacturing procedures to obtain a satisfactory degree of regulation.

These and other difficulties and disadvantages are overcome in accordance with a specific embodiment of the invention shown and described herein for the purposes of illustration wherein there is provided a means responsive to voltage variations across the load, to which current is supplied from an alternating current rectifier, for causing the alternating voltage supplied to the rectifier circuit to vary by such amount and in such direction that the load voltage is maintained substantially constant.

In accordance with the invention the alternating voltage supplied to or present in the rectifier circuit is varied in a new and novel manner by means of a transformer having its primary winding connected in the alternating current circuit and its secondary winding loaded by two three-element vacuum tubes or the like connected with the secondary winding in push-pull arrangement. A control voltage proportional to either current or voltage variations in the load circuit is compared with a fixed D.C. reference voltage in a chopper or vibrator driven by and synchronized with the alternating current source. The control voltage has a steady state magnitude equal to that of the reference voltage such that when the control voltage varies, the output signal of the chopper is an alternating voltage the phase of which is dependent upon whether the control voltage is greater or lesser than the reference voltage and having a frequency equal to that of the alternating current source and hence the alternating potential present on the plates of the vacuum tubes. The output signal of the chopper is amplified by a conventional high gain amplifier and separately impressed on the control electrodes of the vacuum tubes by means of a phase inverter having two equal output signals proportional to the output signal of the chopper, one being in phase and the other 180° out of phase therewith. The turns ratio of the transformer is selected to provide a suitable plate voltage for the plates of the vacuum tubes. It may now be evident that in such a system the signal on the control electrodes of the vacuum tubes is synchronized with the plate voltages and will vary in amplitude and polarity such that as the voltage or current varies in the load circuit each vacuum tube will alternately be allowed to conduct in such a manner as to compensate for and regulate the voltage or current variations in the load circuit by reason of the reflection of the resistance of each vacuum tube into the primary winding.

In carrying out the invention for low voltage-high current applications the turns ratio of the transformer is selected to provide a step up transformer to obtain the desired plate voltage and for high voltage-low current applications the turns ratio of the transformer is selected to provide a step down transformer to obtain the desired plate voltage thereby allowing the use of the same circuitry and tubes with the exception of the turns ratio of the transformer for regulating the supply of a predetermined amount of electric power.

A more specific object of the invention is to provide electric regulating apparatus capable of a high degree of regulation for both high voltage and low voltage applications.

Another object of the invention is to provide a simple and low power consuming electric regulating apparatus capable of regulating a wide range of power requirements.

These and other objects and features of the invention, together with their incident advantages, will be more readily understood and appreciated from the following detailed description of the preferred embodiment thereof selected for purposes of illustration and shown in the accompanying drawing in which the single figure of the drawing to which reference will now be made is a schematic view of an electric regulating apparatus constructed in accordance with the invention.

Referring now to the drawing there is illustrated an electric regulating apparatus comprising a direct current load circuit 10 supplied through load lines 11—12 and a rectifier 13 from a transformer 14 having a primary winding 15 and a secondary winding 16. The primary winding 17 of a control transformer 18 is connected in series relationship between two of the dry disc rectifiers 19—21 that suply current to one of the load lines 11 and the load line 11 is center tapped on the primary winding 17 such that the load current alternately flows through first and second electrically equal halves 22—23 of the primary winding 17. Two electric devices 24—25 such as for example vacuum tubes or transistors having respectively anodes 26—27, cathodes 28—29, and control electrodes 31—32 are connected in push-pull arrangement to provide an adjustable load for the secondary winding 33 of the control transformer 18 by connecting the anodes 26—27 to the end terminals 34—35 of the secondary winding 33, and connecting the cathodes 28—29 to a grounded common centertapped terminal 36 on the secondary winding 33. The input circuit connecting the control electrodes 31—32 and the load circuit 10 includes a conventional chopper or vibrator 37 synchronized with and driven by the alternating current supply source, a high-gain amplifier 38 driven by the output signal of the chopper 37, and a phase inverter circuit 39 driven by the output signal of the amplifier 38 and adapted to supply a signal to each control electrode 31—32 proportional to and synchronized with the output signal of the chopper and respectively 180° out of phase with each other. A D.C. reference first voltage 41 having a fixed and predetermined magnitude of any convenient value is applied to one input terminal 42 of the chopper 37 and a second reference or control voltage 43 having a steady state magnitude equal to that of the reference voltage 41 and proportional to either current or voltage variations in the load circuit 10 is applied to the remaining input terminal 44 of the chopper 37. The output signal of the chopper during regulation is an alternating substantially square-wave signal having a frequency equal to that of the current source, an amplitude dependent upon the difference between the D.C. reference voltage 41 and the control voltage 43, and a phase dependent upon whether the control voltage 43 is greater or lesser than the D.C. reference voltage 41. The amplifier 38 performs the function of amplifying the generally small output signal of the chopper 37 such that the final signal impressed on each control electrode 31—32 will be sufficient to control the vacuum tubes 24—25 over a desired operating range. The output signal of the amplifier 38 is connected to a phase inverter circuit 39 adapted to supply two equal output signals opposite in phase relationship and connected respectively to each control electrode 31—32.

The chopper 37 automatically compares the D.C. reference voltage 41 and the control voltage 43 and has an output signal dependent upon the magnitude of the two input voltages. When the two voltages are equal, the output signal of the chopper 37 will be a D.C. voltage. When the control voltage has a magnitude greater than the D.C. reference voltage due for example to an increase in load current, the output signal of the chopper will be substantially a square wave alternating voltage having a peak to peak amplitude substantially equal to the difference between the input voltages; and when the control voltage has a magnitude less than the D.C. reference voltage due for example to a decrease in load current, the output signal of the chopper will be a square wave alternating voltage having a peak to peak amplitude substantially equal to the difference between the input voltages and opposite in phase relationship to the aforementioned output signal. The output signal of the chopper which may be of the order of .01 to .1 volt is amplified by the amplifier 38 to a suitable level and impressed on the control electrodes 31—32 by means of the phase inverter 39 as two equal signals 180° out of phase with each other. The signals impressed on the control electrodes 31—32 are synchronized with the alternating voltages impressed on the anodes 26—27 of the vacuum tubes; hence, for example, when the anode 26 of vacuum tube 24 is going positive the control electrode 31 associated therewith has a positive potential thereby causing the vacuum tube 24 to conduct at a predetermined rate while the other vacuum tube 25 is cut off due to the negative potential on its anode 27 and the negative potential on its control electrode 32.

It may now be apparent that as the resistance of each vacuum tube 24—25 is varied by the same amount this resistance is reflected into the primary winding 17 of the control transformer 18 and hence in series at all times with the load circuit 10 and that variations of the resistance of each vacuum tube 24—25 of the proper amount and in the proper direction may be utilized to accurately control electrical variations in the load circuit 10.

The phase of the output signal of the chopper 37 is always such that, for example, for a decrease in load current the signal impressed on each control electrode is positive when its respective anode voltage is positive and for an increase in load current the signal impressed on each control electrode is negative when its respective anode voltage is positive.

The maximum range of power variation in the load circuit 10 that may be regulated is substantially determined by the maximum current conducting properties of the vacuum tubes selected and may be varied or changed merely by substituting tubes having greater or lesser current carrying capacity and/or a greater or lesser range of current carrying capacity. Although each vacuum tube may be individually biased, such is not generally necessary since the D.C. reference voltage 41 and the control voltage 43 are never exactly the same, hence, sufficient voltage is always present on the control electrodes 31—32 to bias the vacuum tubes intermediate cut off and maximum conduction such that substantial compensation of the load current in either direction is always possible.

The desirable degree of regulation is obtained by the selection of the amplification factor of the amplifier 38 and it may now be obvious that a very high degree of regulation may be obtained with an amplifier having a high amplification factor such that minuscule variations in the control voltage 43 are reflected as large changes in signal on the control electrodes 31—32.

It will now be understood by those experienced in the art that the turns ratio of the control transformer 18 supplies the necessary plate voltage on the vacuum tubes thereby eliminating the necessity of a separate B+ supply and also reflects the proper resistance of the tubes into the load circuit or input circuit, depending on the location of the transformer, to instantaneously and accurately compensate for variations in the load. It will be further understood by those experienced in the art that for regulation of the same amount of power irrespective of the magnitude of the voltage, the same vacuum tubes having relatively low current conducting capacity may be used without adversely affecting regulation by merely adjusting or reversing the turns ratio of the control transformer and, if necessary adjusting the reference and/or control voltages.

The invention is especially useful for the regulation of conventional low voltage-high current rectifiers and has been found equally useful for maintaining constant the illumination of an electric lamp such as for example light sources and the like used in the photographic art for developing or photographing. In the latter case the control voltage is derived from a point intermediate to two conventional photoelectric cells connected in series to a source of current, one photoelectric cell having a peak sensitivity in the red region of the spectrum and the other photoelectric cell having a peak sensitivity in the blue region of the spectrum. The reference voltage is adjusted to a value proportional to the desired color temperature of the lamp hence when the current supplied to the light source varies from the desired amount thereby causing a change from the desired amount of illumination the control voltage changes due to the increased or decreased conduction of the proper photoelectric cell and the current supplied to the light source is immediately adjusted to maintain it constant in the manner described hereinbefore.

It may now be readily appreciated that while there has been described only a preferred embodiment of the invention by way of illustration, many modifications will occur to those skilled in the art, and it is desired, therefore, that it be understood that it is intended in the appended claims to cover all such modifications as fall within the true spirit and scope of the invention.

What is claimed as new and desired to secure by Letters Patent of the United States is:

1. Apparatus responsive to changes of voltage across a load circuit for maintaining the load voltage substantially constant comprising: rectifying means for supplying direct current to the load; means for supplying alternating current to said rectifier; a transformer having a first winding and a second winding, said first winding forming a part of said rectifier and center-tapped to the load whereby said alternating current alternately flows in opposite directions through each half of said first winding; means for generating a first electric reference signal of substantially constant value; means for generating a second electric reference signal which varies in accordance with load variations; first and second electronic devices having respectively an anode, a cathode and a control electrode comprising a load for said second transformer winding; means actuated by said alternating current for comparing said first and second reference signals and having a varying output signal synchronized with said alternating current and reversible in phase relationship therewith when said second electric signal varies past the magnitude of said first electric signal, the amplitude of said output signal being proportional to the variations of said second electric signal; and means for receiving said output signal and impressing upon each control electrode a signal equal in amplitude but opposite in phase relationship one with the other.

2. Apparatus responsive to changes in a load circuit for maintaining the load voltage substantially constant comprising: rectifying means for supplying direct current to the load; means for supplying alternating current to said rectifier; voltage transforming means having a first element and a second element, said first element being connected to the output of said rectifier such that said alternating current flows through it and thence to said load; first and second electronic devices having respectively an anode, a cathode, and a control electrode connected to said second element; means for generating an electric reference signal which varies in accordance with the variations of said load; means actuated by said alternating current for comparing said electric reference signal with a reference signal of substantially constant value, said means having a varying output signal synchronized with said alternating current and reversible in phase relationship therewith when said electric reference signal varies past the magnitude of said electric signal, the amplitude of said output signal is proportional to the variations of said electric reference signal; and means for receiving said output signal and impressing upon each of said control electrode a signal equal in amplitude but opposite in phase relationship with the other.

References Cited in the file of this patent

UNITED STATES PATENTS

| 2,246,905 | Uehling | June 24, 1941 |
| 2,392,434 | Trucksess | Jan. 8, 1946 |
| 2,717,352 | Ribner | Sept. 6, 1955 |

FOREIGN PATENTS

| 915,392 | France | July 22, 1946 |